Feb. 14, 1961  R. F. THORNTON  2,971,404
LOCKING DIFFERENTIAL
Filed Aug. 26, 1958  8 Sheets-Sheet 2

INVENTOR.
RAY F. THORNTON
BY
SMITH, OLSEN & KOTTS
ATTORNEYS

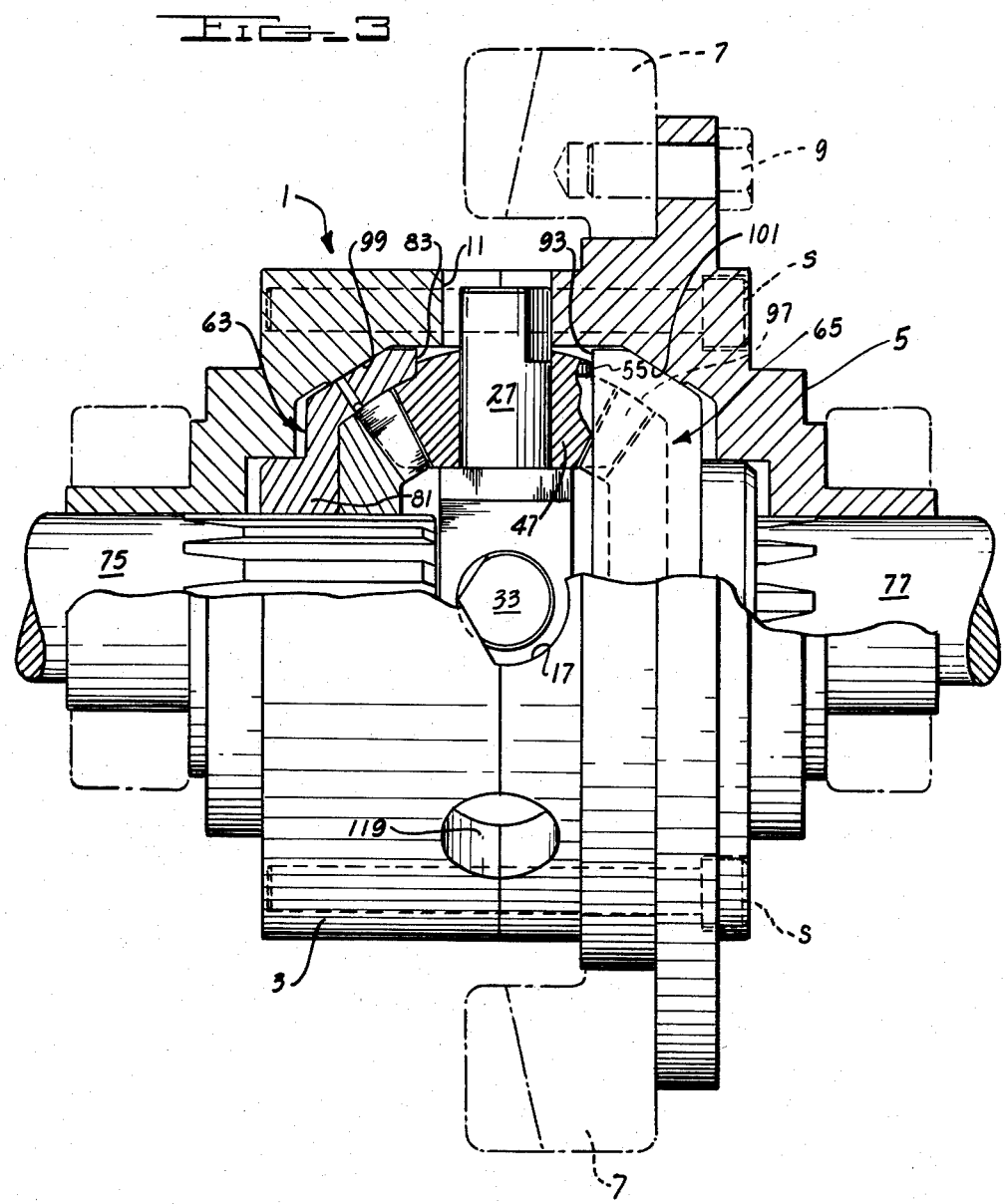

Feb. 14, 1961 R. F. THORNTON 2,971,404
LOCKING DIFFERENTIAL
Filed Aug. 26, 1958 8 Sheets-Sheet 4
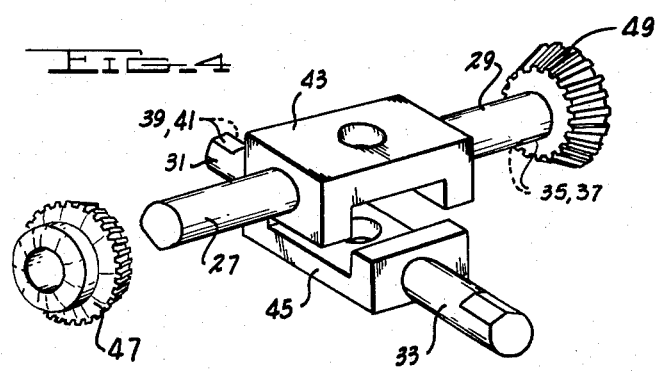
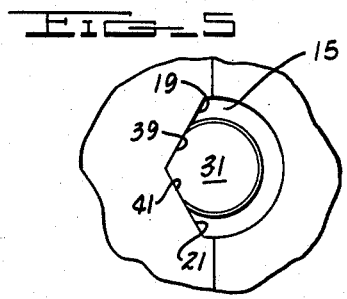 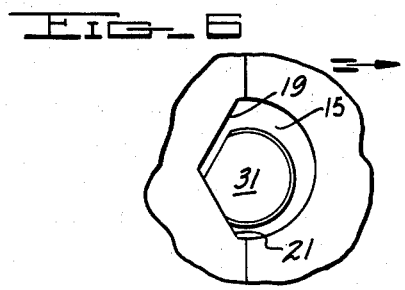
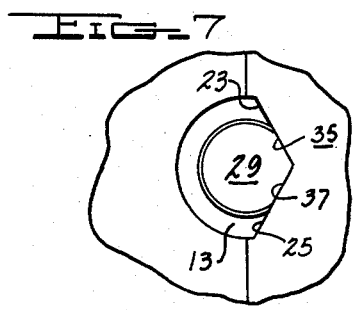 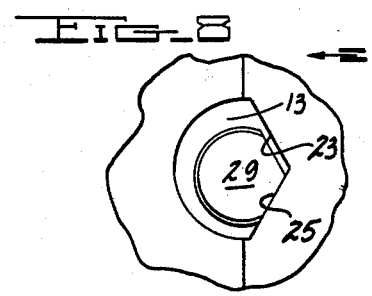
INVENTOR.
RAY F. THORNTON
BY
SMITH, OLSEN & KOTTS
ATTORNEYS

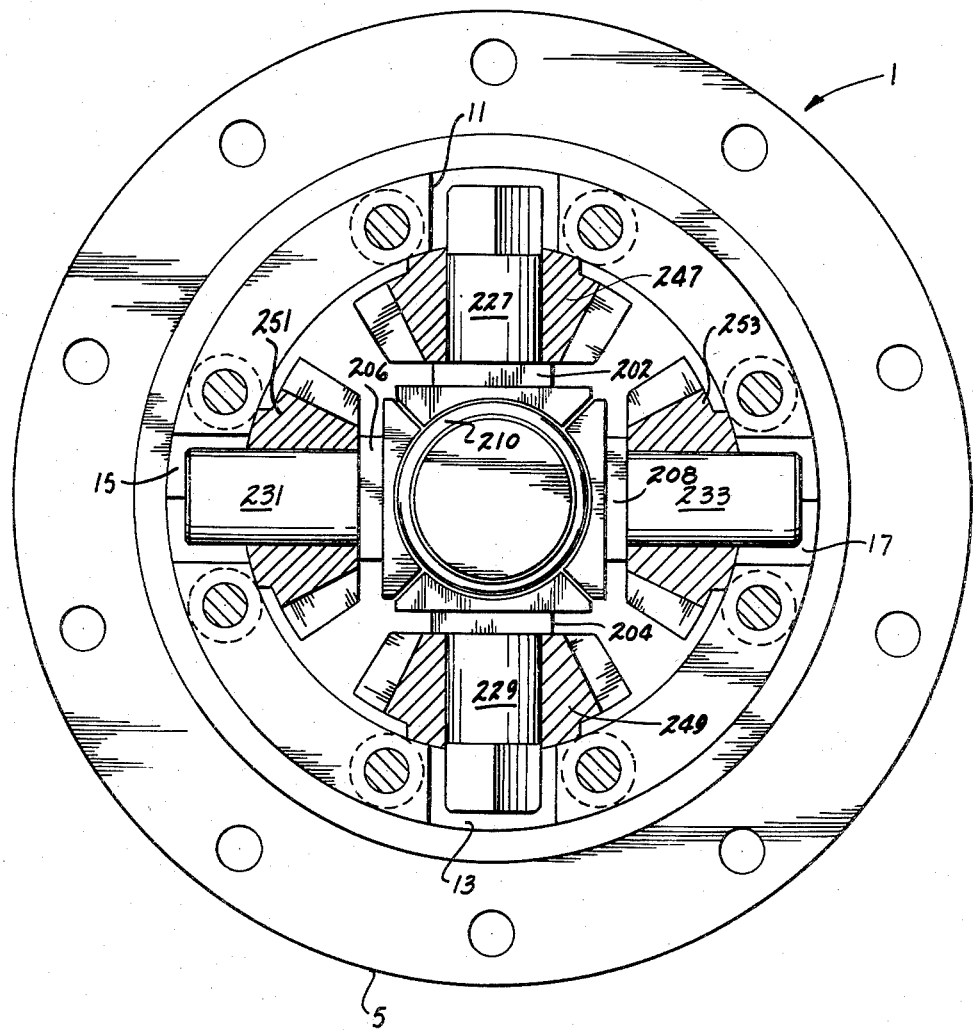

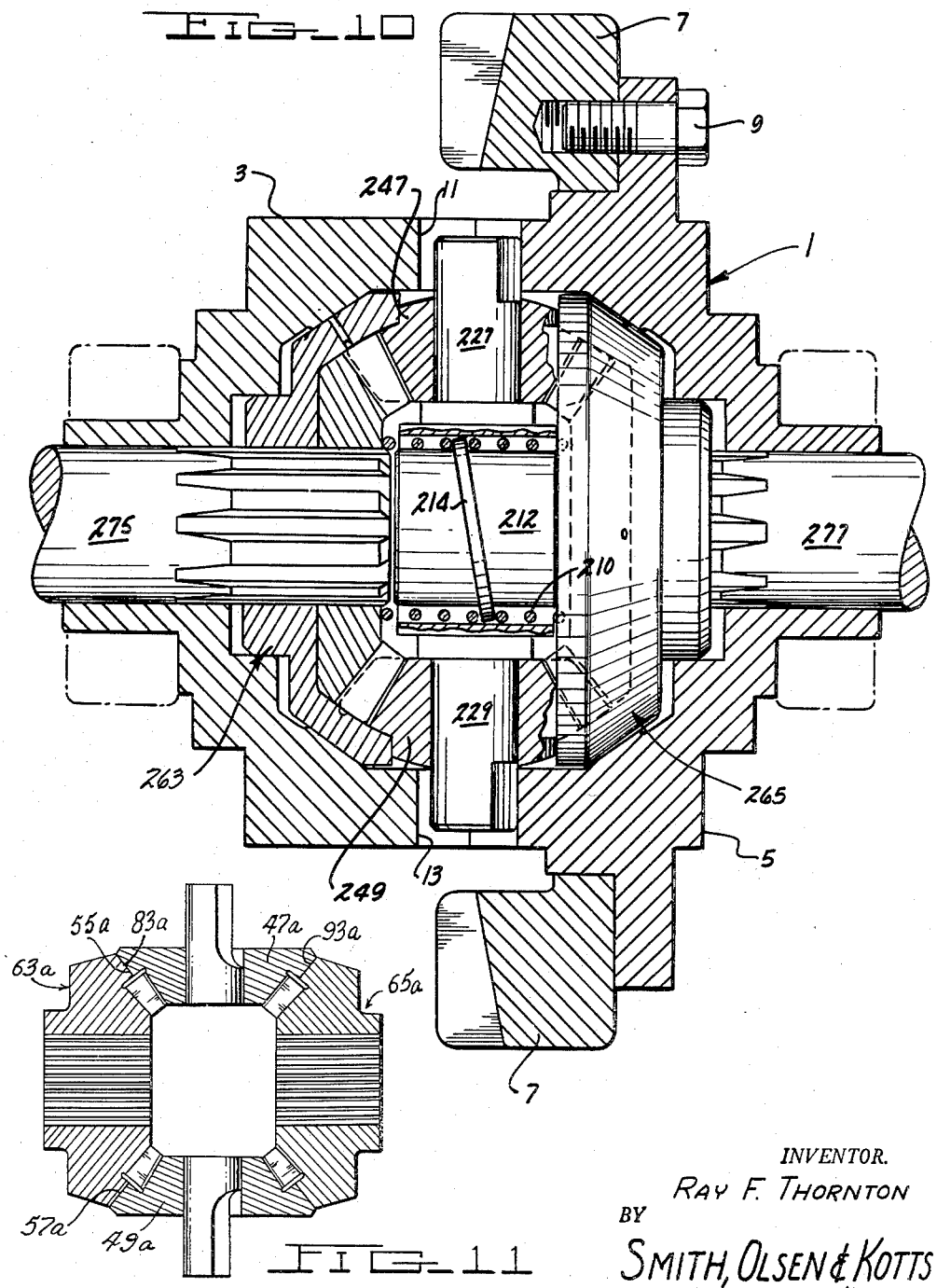

Feb. 14, 1961   R. F. THORNTON   2,971,404
LOCKING DIFFERENTIAL
Filed Aug. 26, 1958   8 Sheets-Sheet 7
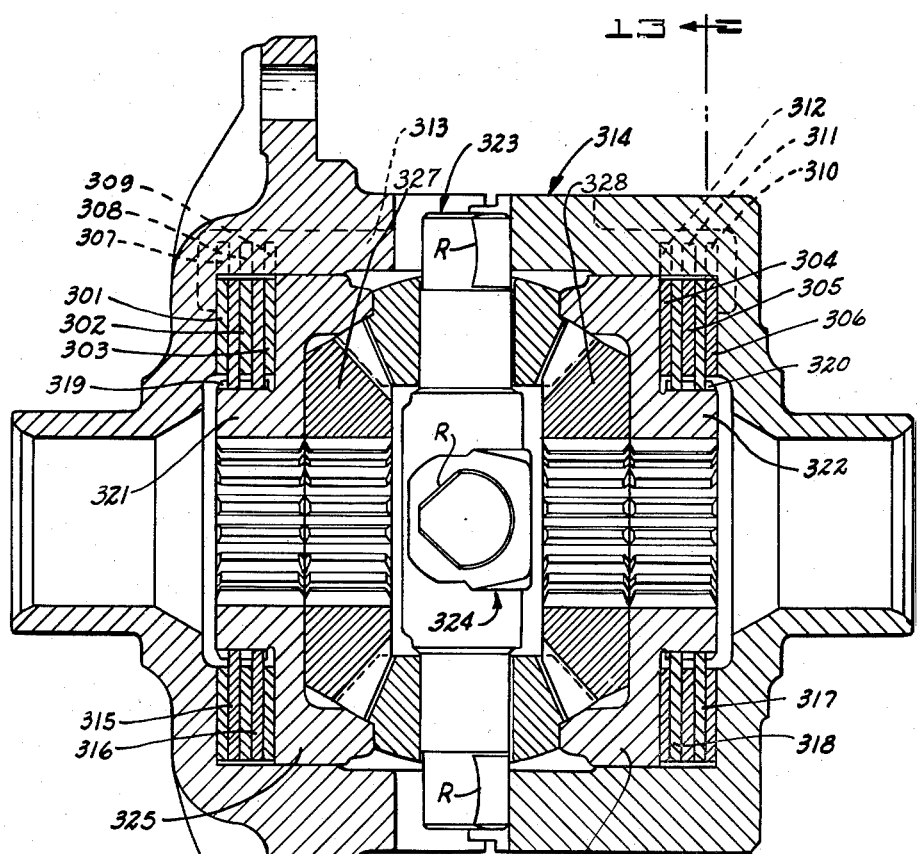
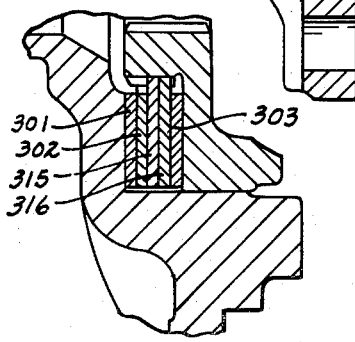
INVENTOR
RAY F. THORNTON
KOTTS & SHERIDAN
ATTORNEYS Feb. 14, 1961  R. F. THORNTON  2,971,404
LOCKING DIFFERENTIAL
Filed Aug. 26, 1958  8 Sheets-Sheet 8
FIG_13
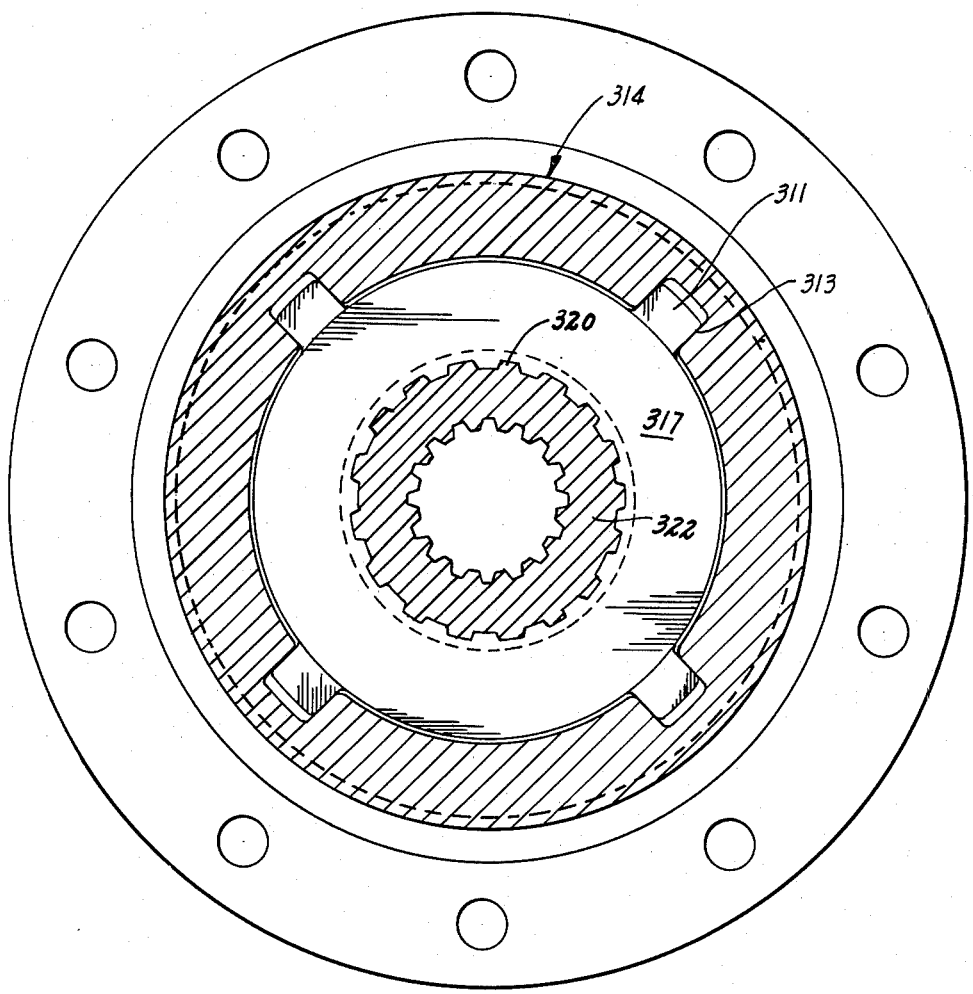
INVENTOR
RAY F. THORNTON
KOTTS & SHERIDAN
ATTORNEYS

United States Patent Office 2,971,404
Patented Feb. 14, 1961

2,971,404

LOCKING DIFFERENTIAL

Ray F. Thornton, 8735 Jackson Road, Dexter, Mich.

Filed Aug. 26, 1958, Ser. No. 764,469

19 Claims. (Cl. 74—711)

The present invention relates to improvements in a locking differential construction which is particularly but not exclusively adapted for use with motor vehicles.

The present application is a continuation-in-part of applications Serial No. 328,177, now abandoned, filed December 27, 1952, and Serial No. 533,153, now abandoned, filed September 8, 1955.

Prior to the present invention, there have been many attempts to provide a differential construction for motor vehicles which would afford an effective locking of the wheels with efficient distribution of torque to both wheels when one wheel is subjected to greater resistance than the other, and which would also permit efficient differential action when one wheel must rotate faster than the other, as when the vehicle turns a corner. Such attempts have resulted in complicated mechanisms which are subject to excessive wear or which will not effectively lock or unlock as desired.

A conventional approach to this problem is to provide the differential locking mechanism with locking springs, ratchets and the like acting against the side gears. As opposed to such construction, I propose to effect the locking action of the differential by distributing the power from the power source in two directions from the central coupling mechanism or spider to the power delivery members or side gears, while still maintaining efficient differential action when required.

It is the principal object of the present invention to provide a differential construction which will provide a strong and efficient lock to the power delivery members or side gears when power is transmitted from the power source to the driving member or differential case, but which will unlock the power delivery members in response to a very small rotational force when one said power delivery member tends to rotate faster than the driving member.

It is another object of the present invention to provide a differential construction of the above type wherein wheel runaway is completely eliminated.

It is another object of the present invention to provide a locking differential construction wherein the force from the power source is split in two directions from the center of the driving member or differential case, which construction provides efficient differential action when required.

It is a further object of the present invention to provide an efficient locking differential mechanism which is simple and economical to manufacture and which can readily replace present conventional differentials.

In the drawings:

Fig. 3 is an elevational view of the construction shown in Fig. 1, partly broken away, taken from the rear.

Fig. 4 is an exploded perspective view, reduced in size, of the complete spider assembly, including two of the pinions.

Fig. 5 is a fragmentary view taken along the lines 5—5 in the direction of the arrows, Fig. 2.

Fig. 6 is a fragmentary view similar to Fig. 5 but showing the spider pin in the locked position.

Fig. 7 is a fragmentary view taken along the line 7—7, in the direction of the arrows, Fig. 2.

Fig. 8 is a fragmentary view similar to Fig. 7 but showing the spider pin in the locked position.

Fig. 9 is a mid-sectional elevation of the second embodiment of the present invention showing four separate spider pins.

Fig. 10 is a rear sectional elevation of the embodiment shown in Fig. 9.

Fig. 11 is a sectional elevation showing a one piece side gear construction.

Fig. 12 is a mid-sectional rear elevation of another embodiment of the present invention, utilizing a plate type clutch rather than a cone type clutch.

Fig. 13 is a sectional view taken along the line 13—13 in the direction of the arrows, Fig. 12.

Fig. 14 is a fragmentary sectional view showing the plates of Fig. 12 rearranged to provide less effective clutching area.

Figure 1:
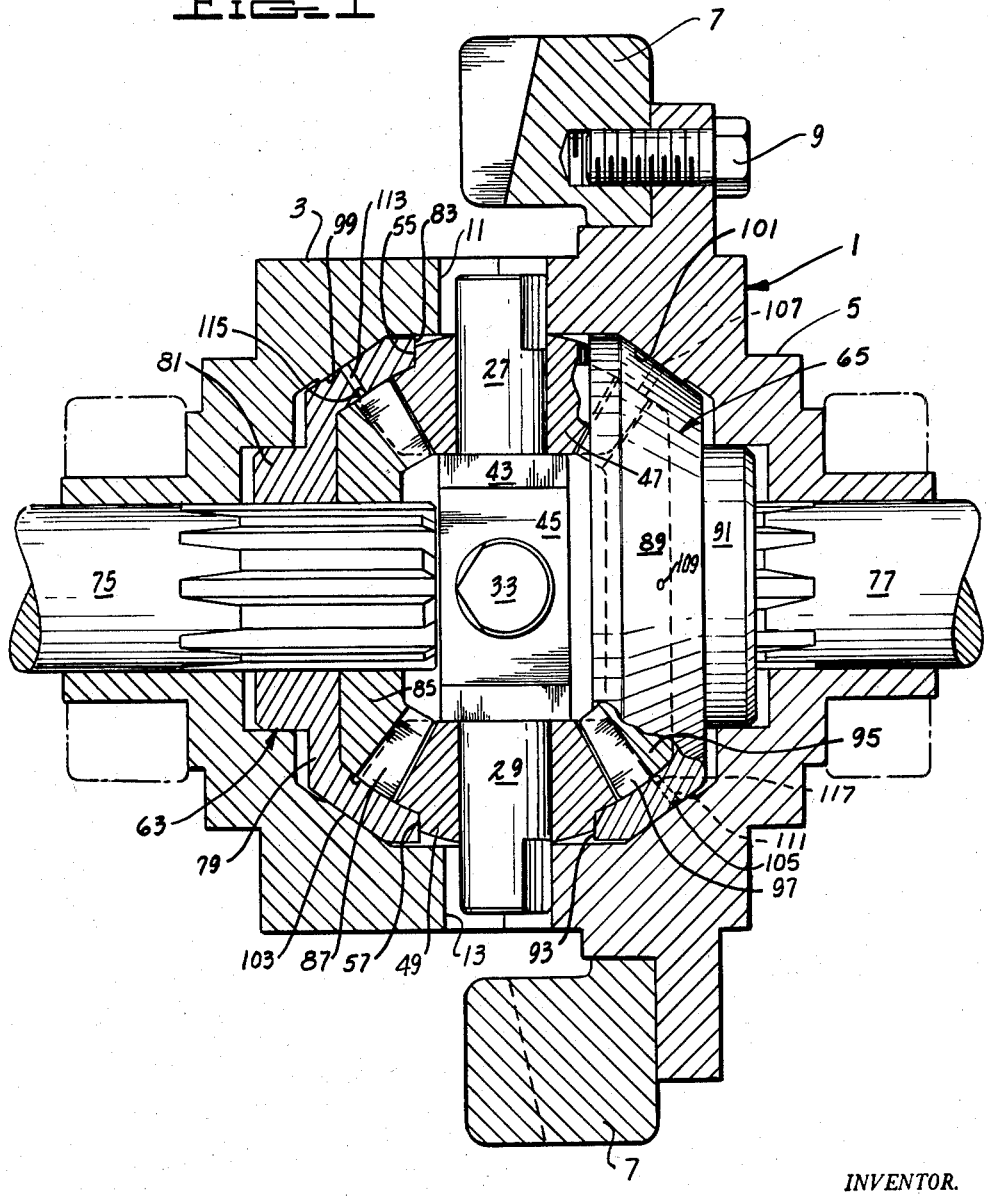
Fig. 1 is a mid-sectional elevation taken from the rear of a vehicle differential construction utilizing the first embodiment of the present invention.
Figure 2:
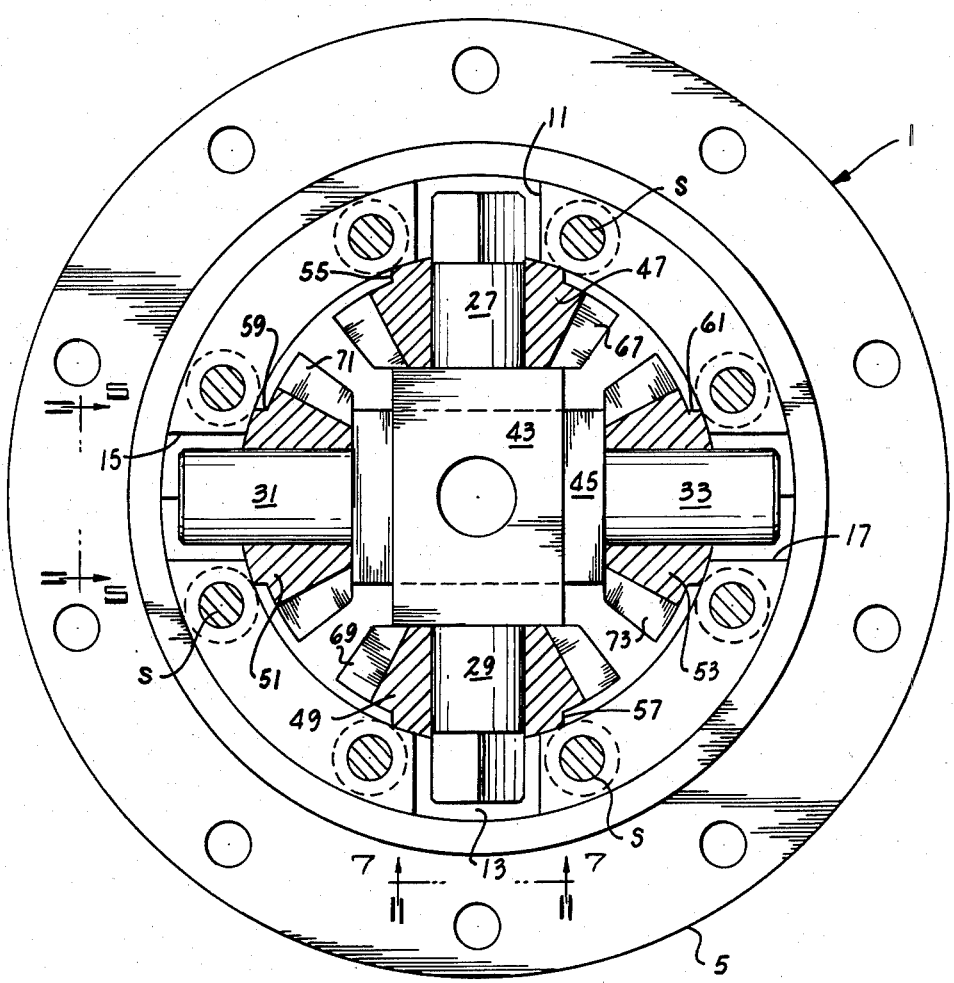
Fig. 2 is a mid-sectional elevation of the differential construction shown in Fig. 1 of the drawings, and taken from the right side.

The first embodiment of the present invention is disclosed in Figs. 1–8 of the drawings. The number 1 designates a driving member or differential case which is formed of two sections 3 and 5. The section 5 has a ring gear 7 affixed thereto by any suitable means such as bolts 9, and the case sections 3 and 5 are joined by means such as Allen screws S (Figs. 2 and 3). Bearings are shown in phantom affixed to the hubs of the case sections. The driving element or differential case 1 has a plurality of rounded openings 11, 13, 15 and 17 therein. All of the openings have converging cam walls. The openings 11 and 13 have cam walls which converge in one direction and the openings 15 and 17 have cam walls which converge in the opposite direction. The construction of the openings 13 and 15 will be discussed in detail, and it is to be understood that the construction of opening 11 is identical with that of 13 and the construction of opening 17 is identical with that of 15. The opening 15 has the converging cam walls 19 and 21 (Fig. 5) which forms an angle at their point of convergence. Although different angles may be used successfully, an angle of 120 degrees has been found desirable. The opening 13 has the cam walls 23 and 25 (Fig. 7) which are similar in construction to the cam walls 19 and 21 in the opening 15 (Fig. 5) except that said walls 23 and 25 converge in the opposite direction.

Coupling means is provided in the form of spider pins for coupling the driving member or case to the power delivery members or side gears. As shown in the drawings, four separate rounded spider pins 27, 29, 31 and 33 are disposed in the openings 11, 13, 15 and 17 respectively. The construction of the pins 29 and 31 will be discussed in detail, and it is to be understood that the construction of pin 27 is identical to that of pin 29, and the construction of pin 33 is identical to that of pin 31. The pin 29 has converging cam faces 35 and 37 (Fig. 7) which form an angle at their point of convergence which is substantially the same as the angle of the cam walls 23 and 25 in the opening 13. The spider pin 31 has the cam faces 39 and 41 (Fig. 5) which are similar in construction to the cam faces 35 and 37 on spider pin 29 except that said faces 39 and 41 converge in the opposite direction.

The spider pins 27 and 29 are formed on opposite ends of a C-shaped spider section 43 as shown in Fig. 4 of the drawings. The spider pins 31 and 33 are formed on opposite ends of a second C-shaped spider section 45, and the two spider sections 43 and 45 are fitted together in the operative position (see Figs. 1 and 2). Differential pinions 47, 49, and 51 and 53 are seated on said spider sections to rotate on the respective spider pins (see Figs. 2 and 4). The separate spider sections 43 and 45, and the spaces between the spider pins 27, 29, 31 and 33 and the adjacent case openings 11, 13, 15 and 17 permit movement of the spider pins within the said case openings.

The pinions 47, 49, 51 and 53 are provided with track portions 55, 57, 59 and 61 which are adapted to engage track portions on the cup portions of the two power delivery members or side gears 63 and 65 in a manner which will now be described. The pinions 47, 59, 51 and 53 are also provided with teeth 67, 69, 71 and 73 which are adapted to engage the teeth in the power delivery members or side gears.

Two power delivery members or side gears 63 and 65 are drivided within the driving member or case 1. These power delivery members or side gears 63 and 65 are adapted to transfer power from the driving member or case 1 to the axle shafts 75 and 77, which axle shafts are coupled with the vehicle wheels in conventional manner.

The power delivery member or side gear 63 includes a side gear cup 79 which has a splined hub 81 engaged with the splined portion of axle shaft 75. The side gear cup 79 has a track portion 83 which is engaged with the track portions 55, 57, 59 and 61 on the differential pinions. A side gear element 85 is disposed in slidable splined engagement with axle shaft 75 within the side gear cup 79. Teeth 87 are formed on the side gear element 85, and these teeth engage with the teeth 67, 69, 71 and 73 on the differential pinions.

The power delivery member or side gear 65 includes a side gear cup 89 which has a splined hub 91 engaged with the splined portion of axle shaft 77. The side gear cup 89 has a track portion 93 which is engaged with the track portions 55, 57, 59 and 61 on the differential pinions. A side gear element 95 is disposed in slidable splined gengagement with axle shaft 77 within the side gear cup 89. Teeth 97 are formed on the side gear element 95, and these teeth engage with the teeth 67, 69, 71 and 73 on the differential pinions.

Although the side gears are shown in the drawings as being formed of two separate pieces, i.e., the side gear cup and the side gear element, each side gear can be formed as a single piece if desired, or the side gear cup and element can be joined together. A one-piece side gear construction is shown in Fig. 11 of the drawings.

The side gear 63a has a track portion 83a formed thereon which engages track portions on the pinions such as the track portions 55a and 57a on pinions 47a and 49a. The side gear 65a has a track portion 93a formed thereon which also engages the track portions on the pinions. However, it has been found that for most uses with a conventional bevel type gear, the separate gear cup and gear element is preferable.

Locking surfaces 99 and 101 are formed on the interior of the case 1 (Fig. 1), and these locking surfaces are adapted for engagement with clutch faces 103 and 105 on the side gear cups as will be explained later in connection with the operation of the device. Lubrication holes (preferably for or six in number) are provided in each side gear cup 79 and 89. For illustration, Fig. 1 of the drawings shows three such holes 107, 109 and 111 on side gear cup 89, and one such hole 113 on side gear cup 79. These holes provide adequate lubrication between the clutch faces 103 and 105 of the side gear cups and the locking surfaces 99 and 101 of the driving member or case 1 when such lubrication is needed. These holes run from substantially the root diameter of the teeth on the power delivery members or side gears 63 and 65. Each side gear cup 79 and 89 also has a channel groove such as the channel groove 115 in side gear cup 79 (Fig. 1), which connects the lubrication holes in the side gear cup. This permits lubricant to be passed up through the side gear cup even though one or more of the openings may be covered by a tooth of the adjacent side gear element. The teeth on the side gears or power delivery members meshing with the teeth of the pinions squeezes oil efficiently between the clutch faces 103 and 105 and the adjacent locking surfaces 99 and 101 in the case or driving member 1 when the device is unlocked.

Also, lubrication openings such as the opening 119 are provided in the driving member or case 1 in order that adequate lubrication is introduced into the interior of the differential case or driving member 1 from the usual differential housing (not shown) which contains the lubricant.

The operation of the device is as follows:

When the vehicle is starting from a standing position or is moving under power, power from the engine is transferred through the usual drive shaft and drive pinion (not shown) to the ring gear 7 and from the ring gear 7 to the driving member or differential case 1 to which the ring gear is affixed. As the driving member or differential case 1 is rotated, the cam wall 25 of opening 13 is moved against the cam face 37 of the spider pin 29 and the spider pin 29 is moved backward along the cam wall 25 to the position shown in Fig. 8 of the drawings. Thus, as the cam face 37 of the pin 29 moves backward along the cam wall 25 of the driving member or case, there is a component of movement to the left in the direction of the arrow, Fig. 8. Since the spider pin 27 is constructed the same as spider pin 29 and is affixed thereto through the C-shaped spider section 43, the spider pin 27 will also be moved to the left in the same manner that pin 29 is moved. The differential pinions 47 and 49 are carried with the spinder pins 27 and 29 to the left in Fig. 1 toward the power delivery member or side gear 63. This sidewise movement is transferred from the differential pinions 47 and 49 to the side gear cup 79 through the pinion track portions 55, 57 and the side gear cup track portion 83, and thus the gear teeth do not dig in or chew. The side gear element 85 is also moved to the left along its splined engagement with the axle 75 and engages side gear cup 79, helping to move the same to the left along its splined engagement with the axle 75. The clutch face 103 of the side gear cup 79 is forced against the locking surface 99 in the driving member or case 1. In this position, power is transferred from the driving member or case 1 directly to the power delivery member or side gear 63.

As the driving member or differential case 1 is rotated as explained above, the spider pins 31 and 33 are moved to the right as demonstrated in connection with the spider pin 31 in Figs. 5 and 6. The cam wall 21 of the driving member or differential case is moved against the cam face 41 of spider pin 31, and as the spider pin 31 is moved backward along cam face 41 to the position indicated in Fig. 6 there is a component of movement to the right in the direction of the arrow, Fig. 6. Since the spider pin 33 is constructed the same as spider pin 31 and is affixed thereto through the C-shaped section 45, the spider pin 33 will be moved to the right in the same manner that spider pin 31 is moved. The differential pinions 51 and 53 are carried with the spider pins 31 and 33 to the right toward the side gear 65 (Figs 1–3). The sidewise movement is transferred from the differential pinions 51 and 53 to the side gear cup 89 through the track portions 59 and 61 on the pinions 51 and 53 and the track portion 93 on side gear cup 89, and through the gear teeth on the pinions and side gear element 95. The side gear element 95 is moved to the right along its splined engagement with the axle 77 and engages side gear cup 89, helping to move the same to the right along its splined engagement with the axle shaft 77. The clutch face 105 of the side gear cup 89 is forced against the locking surface 101 provided in the driving element or case 1. In this position power is transferred from the driving member or differential case 1 directly to the side gear 65 through the clutch face 105 and locking surface 101 rather than through the differential pinions.

Thus, as the driving member or differential case 1 is rotated forward, the two spider pins 27 and 29 move to the left to lock the side gear 63 to the driving member or case 1, and the two spider pins 31 and 33 move to the right to lock the side gear 65 to the driving member or case 1. In this position of the differential, there is a complete lock and no differentiation, and torque is effectively distributed to both wheels. One wheel cannot spin relative to another so that there is no problem when one wheel is obstructed or when the wheels are on a slippery surface.

The operation of the differential to the locked position is the same when the vehicle is driven in reverse. The only difference is that the opposite cam walls and cam faces are brought into play. Referring to Figs. 5 and 7, as the driving member or case 1 is rotated in reverse, the cam walls 19 and 23 are moved against the cam faces 39 and 35 of the spider pins 31 and 29. Of course, this same action occurs in all four spider pins.

When differential action is demanded, as when the vehicle turns a corner and one wheel rotates faster than the other, differentiation is provided simply and automatically by the construction of the present invention. Without limiting myself specifically, my theory of the internal operation that provides differentiation is as follows. This will be described in connection with the spider pin 29 when the vehicle is making a turn to the right, and it is to be understood that the same principles apply to the spider pin 27. As the vehicle is making a right turn, the left wheel tends to advance and increase in rotational speed. This tendency or force is transferred through the axle shaft 75 to the left power delivery member or side gear 63. The side gear 63 has a tendency to move in opposition to the lock between the locking surface 99 of the driving member or case 1 and the clutch face 103 of the power delivery element or side gear 63. This force is exerted against the pinion track portion 57 and the side gear cup track portion 83, and between the meshed teeth of the differential pinion 49 and the side gear element 85. This reaction force is transferred through the differential pinion 49 to the spider pin 29, and advances this pin a very short distance along the cam wall 25 or at least relieves the force it applies to the locking surface. As previously explained, this same action occurs with respect to spider pin 27. In this position, the lock between the clutch face 103 and the locking surface 99 of the power delivery member or side gear 63 is broken and the locking surface 99 can slip relative to the clutch face 103. The drive is then through the spider pins 27 and 29 and the pinion gears 47 and 49 to the power delivery member or side gear 63, the conventional differential action is permitted with one great difference. This difference is that the driving member or case 1 is still exerting a force through the cam walls to the cam faces of the spider pins 27 and 29, and the outside wheel is driven while differential action is being effected. There is no danger of wheel run-away with such a construction.

If a left turn is executed, the spider pins 31 and 33 are advanced and the lock between the clutch face 105 of the power delivery member or gear 65 and the locking portion 105 of case or driving member 1 is broken.

The rotation of one power delivery member or side gear at a rate greater than the rate of rotation of the driving member or differential case results in the unlocking of the entire unit since the coupling means, which comprises all the spider pins, is moved ahead. Thus, in either a right or left turn the advancing power delivery member or side gear unlocks all four spider pins.

To visualize the unlocking action of an advancing wheel, as opposed to a wheel tending to spin, I believe this can best be done by noting first that there is an equal driving force, an equal distance of travel, and equal torque on both wheels when they are being driven straight ahead. When, however, the left wheel begins to advance relative to the right wheel, as in a right turn, the left wheel moves a greater distance and the right wheel moves a lesser distance than if straight-forward motion had been maintained.

Thus, the advancing wheel, in increasing the relative distance of travel under constant torque, in effect, creates a negative vector force which is passed back to the two spider pins which up to the time of the turn have been forcing the side gear against a case. This negative vector force thus results in a return of the spider pins toward their neutral position and a separation of the locking surfaces.

It will be noted also that the new negative vector force moving the spider pins for the left side to the neutral position will also move the spider pins for the right side to a neutral position resulting in the right side being unlocked simultaneously with the unlocking of the left side.

When the turn of the vehicle has been completed and the advancing wheel, e.g. the left, begins to regain a rate of advance equal to the other wheel, e.g. the right; the negative vector force gradually diminishes and the spider pins again move away from the neutral position and lock the differential by forcing the side gear against the case.

To visualize the operation of my differential under conditions which would induce spin in wheels operating with conventional differentials, I think it best to consider a first situation of starting the vehicle when one wheel is on ice and a second situation of the inside wheel hitting ice while the vehicle is turning.

In the firt instance, that of starting the vehicle with one wheel on ice, neither wheel is advanced and the application of engine force to the spider pins immediately locks both sides of the differential. The locked differential will not permit the wheel on ice to spin and there being no spin and no decrease in torque on either wheel the vehicle will move forward.

In the second instance, that of the inside wheel on a turn contacting ice while the differential is unlocked, there is a tendency for the wheel to increase its peripheral speed. However, as soon as the inside wheel has increased its speed to equal that of the outside wheel, or previously advancing wheel, differentiation is not needed and lock-up occurs so that both wheels are driven directly. If the turning is maintained and the inside wheel moves off the ice, the outside wheel again becomes the advancing wheel and again unlocks the differential to permit differentiation.

Although for better visualization I have explained the operation of my differential assuming constant and equal torque on both wheels, it will be apparent to those skilled in the art that my invention can be applied to other mechanisms with changing or unequal torque on the wheels, gears or other rotational members it being only necessary that there be present a means such as the changing peripheral speed to actuate the spider pins, driving gears, or the like. It will also be apparent that backward motion is equivalent to forward motion in the foregoing analysis.

A second modification of the present invention is disclosed in Figs. 9 and 10 of the drawings. This modification differs from the first modification primarily in that four separate spider pins are provided rather than two separate spider sections carrying two spider pins each.

The spider pins 227, 229, 231 and 233 are provided with the annular flanges 202, 204, 206 and 208 and the differential pinions 247, 249, 251 and 253 are seated on said flanges in rotational engagement with the spider pins. The spider pins can be positioned on a central plug or shaft. However, the spider pins 227, 229, 231 and 233 can also be positioned over a coil spring 210 if desired, and the ends of the coil spring 210 are disposed against side gears 263 and 265 to exert a preload thereon. Any desired preload can be obtained by varying the size and characteristics of the spring. A spacer plug 212 is located within the coil spring 210 and this plug will maintain proper spacing of the axle shafts 275 and 277. A flange 214 is formed on the plug to maintain the coil spring 210 in position during assembly.

The locking and unlocking of the unit is accomplished in substantially the same manner as with the first embodiment, the four separate spider pins being better adapted for certain operations than the two section spider.

The device of the present invention may also be used with a plate type clutch rather than a con type clutch. This construction is shown in Figs. 12–14 of the drawings. The basic principle of operation is the same as it is with the cone type clutch, but the plates have been found preferable in certain instances.

Referring to Fig. 12, it will be noted that annular plates 301, 302, 303, 304, 305 and 306 have outwardly extending lugs 307, 308, 309, 310, 311 and 312 which extend into a recess 313 formed in differential case 314. Usually, four such lugs are provided on each plate, so four recesses occur in the differential case (see Fig. 13).

Annular plates 315, 316, 317 and 318 have inwardly extending spline teeth which engage the splines 319 and 320 in side gear cup hubs 321 and 322.

Thus when power is applied from the power source to the differential case, the spider sections 323 and 324 spread apart and move the pressure rings 325 and 326 against the clutch plates, and the plates 301 and 306 are moved against the differential case 314. When the spider sections are returned toward neutral during differential action, the pressure on the plates is relieved and plates 301–303 can move relative to plates 315 and 316, and plates 304–306 can move relative to plates 317 and 318 as the side gear elements 327 and 328 rotate at speeds different than the differential case speed.

Fig. 14 shows an arrangement whereby plates 301 and 302 are stacked together, and plates 315 and 316 are stacked together. This provides less lock since the total locking area provided by the plates is reduced.

In Fig. 12 it will be noted that there is a small radius R provided on each flat spider pin cam. In normal operation this radius is only about .005 inch. Such a construction seems to eliminate binding of the pins under certain circumstances. Thus the pins are still substantially flat with only a very small radius.

The "movement" of the spider or coupling means relative to the driving member or case is mentioned at various places herein but it is to be understood that such movement may be very small, just a few thousandths of an inch, .003 inch, for example. It is evident that such movement, even though very small, creates a force that is transmitted from the spider into the clutch mechanism, e.g. cones 63 and 65 of Fig. 1 or the flat plates of Fig. 12. This cam force applied by the spider determines the normal pressure on the clutch elements and, therefore, the friction between the elements and case tending to prevent them from rotating relative to each other. When the cam force exceeds a certain value dependent upon the coefficient of friction and the areas involved, the friction resisting relative rotation will be great enough to prevent the relative movement between the side gears and case and the differential will be "locked." Relative rotation or differentiation occurs when one wheel goes faster than the other in a turn as the cam force is decreased or wheel torque is able to overcome the static friction holding the clutch elements to the case.

The construction of the present invention is so simple that it may be built from standard differential parts subjected to modifying operations. The construction is adaptable to any type of conventional differential construction. In spite of the simplicity of the construction, it obtains results which have never been obtained before. The engagement in the locked position is so positive and strong that the axle shafts have been snapped under test before failure of the lock. By the same token, when the two rear wheels of a vehicle have been jacked up and the wheels rotated at slow speeds one wheel can be unlocked by simply placing the hand on the wheel and rotating it faster than the other wheel.

In any of the modifications disclosed, whenever there are two parts in number they are intechangeable. It will be evident that engineering-wise this is, in itself, a substantial accomplishment since the number of special parts required is materially reduced.

Having thus described my invention, I claim:

1. A differential power transmission for use with a power source, including rotatable driving means; first flat converging cam surfaces provided by said driving means; floating coupling means disposed in said driving means and providing second flat converging cam surfaces in slidable engagement with said first cam surfaces; a pair of power delivery members driven by torque applied through rotation of said driving means; differential gearing disposed in said driving means between said power delivery members; and clutch means for locking both of said power delivery members with said driving means for simultaneous rotation therewith upon rotation of said driving means by the power source, the rotation of said driving means causing said second cam surfaces and floating coupling means to be displaced along the first cam surfaces on said driving means to move said clutch means to the locked position; rotation of one of said power delivery members at a rate of rotation greater than the rate of rotation of the driving means reducing the displacement of said second cam surfaces and floating coupling means relative to the first cam surfaces and driving means and unlocking the said clutch means to provide normal differential driving action to both power delivery members.

2. A differential power transmission for use with a power source, including rotatable driving means, first cam surfaces provided by said driving means; floating coupling means disposed in said driving means; second cam surfaces provided by said coupling means, said second cam surfaces being in slidable engagement with said first cam surfaces; a pair of power delivery members in said driving means; differential gearing in said driving means between said power delivery members; and clutch means for locking both of said power delivery members with said driving means for simultaneous rotation therewith upon rotation of said driving means by the power source, the rotation of said driving means causing said second cam surfaces and floating coupling means to be displaced along the first cam surfaces on said driving means to move said power delivery members outwardly apart and lock said clutch means; rotation of one of said power delivery members at a rate of rotation greater than the rate of rotation of the driving means reducing the displacement of said second cam surfaces and floating coupling means relative to said first cam surfaces and driving means and unlocking said clutch means to provide normal differential driving action to both power delivery members.

3. A differential power transmission for use with a power source, including a driving member having a plurality of openings therein which provide cam walls; a plurality of spider pins one disposed in each of said openings; a plurality of pinions one rotatably mounted on each of said spider pins; a cam surface on each of said pins; said openings and spider pins being so constructed and arranged that when power from said power source is applied to said driving members some of said spider pins move outwardly toward one side of said driving member and the other of said spider pins move outwardly toward the other side of said driving member; a pair of side gears disposed in said driving member in mesh with said pinions; and locking means for locking said side gears with said driving member when said spider pins are moved outwardly in a sidewise direction, said side gears being automatically and simultaneously unlocked to provide differential action upon the rotation of either side gear at a rate greater than the rate of rotation of said driving member.

4. A differential power transmission for use with a power source, including a driving member having a plurality of openings therein, certain of said openings having cam walls converging toward one side of said driving member and certain of said openings having cam walls converging toward the other side of said driving member; a plurality of spider pins one disposed in each of said openings and having cam faces to match said cam walls, said spider pins being so constructed and arranged that when power is applied to said driving member some of said spider pins move toward one side of said driving member and the other of said spider pins move toward the other side of said driving member; a plurality of differential pinions one rotatably mounted on each of said spider pins; a pair of side gears disposed in said driving member in mesh with said pinions; and means for locking said side gears with said driving member when power from said power source is applied to said driving member and said spider pins move along said cam walls to cause outward sidewise movement of said differential pinions and side gears, said side gears being automatically and simultaneously unlocked to provide differential action upon the rotation of one of said side gears at a rate greater than the rate of rotation of one of said side gears at a rate greater than the rate of rotation of said driving member.

5. A differential power transmission for use with a power source, including a driving member having a plurality of openings therein, certain of said openings having cam walls converging toward one side of the driving member and certain of said openings having cam walls converging toward the other side of said driving member; a plurality of spider pins one disposed in each of said cam openings and having cam faces to match said cam walls, said spider pins being so constructed and arranged that when power is applied to said driving member some of said spider pins move toward one side of said driving member and the other of said spider pins move toward the other side of said driving member; a plurality of pinions one rotatably mounted on each of said spider pins; a pair of side gears disposed in said driving member in mesh with said pinions; locking portions in said driving member adjacent said side gears; and clutch faces on said side gears; said clutch faces being forced against said locking portions to lock said side gears with said driving member when power is applied from said power source to said driving member and said spider pins move along said cam walls to cause outward sidewise movement of said differential pinions and side gears; said side gears being automatically and simultaneously unlocked to provide differential action upon the rotation of one of said side gears at a rate greater than the rate of rotation of said driving member.

6. A differential power transmission for use with a power source, including a driving member having a plurality of openings therein, certain of said openings having cam walls converging toward one side of said driving member and certain of said openings having cam walls converging toward the other side of said driving member; a plurality of spider pins one disposed in each of said cam openings and having cam faces to match said cam walls, said spider pins being so constructed and arranged that when power is applied to said driving member some of said spider pins move toward one side of said driving member and the other of said spider pins move toward the other side of said driving member; a plurality of pinions one rotatbly mounted on each of said spider pins; a pair of side gears disposed in said driving member in mesh with said pinions; locking portions in said driving member adjacent said side gears; and clutch faces on said side gears; said clutch faces being forced against said locking portions to lock said side gears with said driving member when power is applied from said power source to said driving member and said spider pins move along said cam walls to cause outward sidewise movement of said differential pinions and side gears, said side gears being automatically and simultaneously unlocked by operation of the unit to provide differential action upon the rotation of one of said side gears at a rate greater than the rate of rotation of said driving member; said side gears also having openings therein to distribute lubricant between said clutch faces and locking portions in the unlocked position.

7. A differential power transmission for use with a power source, including a driving member having a plurality of openings therein, certain of said openings having cam walls converging toward one side of said driving member and certain of said openings having cam walls converging toward the other side of said driving member; a plurality of spider pins one disposed in each of said cam openings and having cam faces to match said cam walls, said spider pins being so constructed and arranged that when power is applied to said driving member some of said spider pins move toward one side of said driving member and the other of said spider pins move toward the other side of said driving member; a plurality of pinions one rotatably mounted on each of said spider pins; a pair of side gears disposed in said driving member in mesh with said pinions; and means for locking said side gears with said driving member when power from said power source is applied to said driving member and said spider pins move along said cam walls to cause outward sidewise movement of said differential pinions and side gears; said side gears being automatically and simultaneously unlocked to provide differential action upon the rotation of one of said side gears at a rate greater than the rate of rotation of said driving member; the cam faces of said spider pins being maintained in engagement with the adjacent cam walls as long as power is applied to said driving member to provide a constant drive even during differential operation.

8. A differential power transmission for use with a power source, including a driving member having a plurality of openings therein, certain of said openings having cam walls converging toward one side of said driving member and certain of said openings having walls converging toward the other side of said driving member; side gears rotatably and slidably mounted in said driving member; a clutch face on each of said side gears, locking surfaces in said driving member adjacent the clutch faces on said side gears; track portions on said side gears; a plurality of spider pins one disposed in each of said cam openings and having cam faces to match said cam walls, said spider pins being so constructed and arranged that when power is applied to said driving member some of said spider pins move toward one side of said driving member and the other of said spider pins move toward the other side of said driving member; a plurality of differential pinions in mesh with said side gears, one pinion being rotatably mounted on each of said spider pins and having a track portion engaging said side gear track portions; said spider pins moving along said cam walls to force the clutch faces of said side gears against said locking surfaces to lock said side gears with said driving member when power is applied from said power source to said driving member; said side gears being automatically and simultaneously unlocked to provide differential action upon the roation of one of said side gears at a rate greater than the rate of rotation of said driving member.

9. A differential power transmission for use with a power source, including a driving member having a plurality of openings therein, certain of said openings having cam walls converging toward one side of said driving member and certain of said openings having walls converging toward the other side of said driving member; side gears rotatably and slidably mounted in said driving member; a clutch face on each of said side gears; locking surfaces in said driving member adjacent the clutch faces on said side gears; track portions on said side gears; a plurality of spider pins one disposed in each of said cam openings and having cam faces to match said cam walls, said spider pins being so constructed and arranged that when power is applied to said driving member some of said spider pins move toward one side of said driving member and the other of said spider pins move toward the other side of said driving member; a plurality of differential pinions in mesh with said side gears one pinion being rotatably mounted on each of said spider pins and having a track portion engaging said side gear track portions; said spider pins moving along said cam walls to force the clutch faces of said side gears against said locking surfaces to lock said side gears with said driving member when power is applied from said power source to said driving member; said side gears being automatically and simultaneously unlocked to provide differential action upon the rotation of one of said side gears at a rate greater than the rate of rotation of said driving member; said side gears also having openings therein to distribute lubricant between said clutch faces and locking portions in the unlocked position.

10. A differential power transmission for use with a power source, including a driving member having a plurality of openings therein, certain of said openings having cam walls converging toward one side of said driving member and certain of said openings having cam walls converging toward the other side of said driving member; side gears rotatably and slidably mounted in said driving member; clutch means for locking said side gears with said driving member; track portions on said side gears; a plurality of spider pins one disposed in each of said cam openings and having cam faces to match said cam walls; a plurality of differential pinions in mesh with said side gears, one pinion being rotatably mounted on each of said spider pins and having a track portion engaging said side gear track portions; and means disposed between said side gears to exert a preload on said side gears.

11. A differential power transmission for use with a power source, including a driving member having four circumferential openings therein which provide cam walls; two spider sections each having a pair of oppositely extending spider pins thereon, one of such spider pins extending into each of the circumferential openings in said driving member; a differential pinion rotatably mounted on each of said spider pins; a pair of side gears in said driving member in mesh with said pinions; a cam surface on each of said spinder pins which engages the adjacent cam wall in the driving member opening; said openings and spider pins being so constructed that when power from said power source is applied to said driving member one of said spider sections with accompanying pins moves toward one side of said driving member and the other of said spider sections with accompanying pins moves toward the other side of said driving member; and locking means for locking said side gears with said driving member when said spider sections are moved outwardly in a sidewise direction; said side gears being automatically and simultaneously unlocked to provide a differential action upon the rotation of either side gear at a rate greater than the rate of rotation of said driving member.

12. A differential power transmission for use with a power source, including a driving member having four circumferential openings therein, one pair of said openings having cam walls converging toward one side of said driving member and the other pair of said openings having cam walls converging toward the other side of said driving member; two spider sections each having a pair of oppositely extending spider pins thereon, one of such spider pins extending into each of the circumferential openings in said driving member; a differential pinion rotatably mounted on each of said spider pins; a pair of side gears disposed in said driving member in mesh with said pinions; a cam surface on each of said spinder pins; said openings and spider pins being so constructed that when power from said power source is applied to said driving member one of said spider sections with accompanying pins moves outwardly toward one side of said driving member and the other of said spider sections with accompanying pins moves outwardly toward the other side of said driving member; and locking means for locking said side gears with said driving member when said spider sections are moved outwardly in a sidewise direction; said side gears being automatically and simultaneously unlocked to provide a differential action upon the rotation of either side gear at a rate greater than the rate of rotation of said driving member; said side gears also having openings therein to lubricate said locking means when the side gears are in the unlocked position.

13. A differential power transmission for use with a power source, including a driving member having a plurality of openings therein which provide cam walls; a pair of side gears each comprising a side gear cup disposed in said driving member and adapted for splined connection with an axle shaft, and a toothed side gear element positioned with said side gear cup and also adapted for splined engagement with an axle shaft; track portions formed on said side gear cups; a plurality of spider pins one disposed in each of said openings; a plurality of pinions one rotatably mounted on each of said spider pins in mesh with said side gear elements, each pinion having a track portion thereon engaged with the track portions on said side gear cups; a cam surface formed on each of said pins; said driving member openings and spider pins being so constructed and arranged that when power from said power source is applied to said driving member some of said spider pins move outwardly toward one side of said driving member and the other of said spider pins move outwardly toward the other side of said driving member; and locking means for locking said side gears with said driving member when said spider pins are moved outwardly in a sidewise direction; said side gears being automatically and simultaneously unlocked to provide a differential action upon the rotation of either side gear at a rate greater than the rate of rotation of said driving member.

14. A differential power transmission for use with a power source, including a case; side gears disposed in said case; pinion gears in said case in mesh with said side gears; and laterally spreadable actuating means within said case for locking said side gears against rotation relative to said case; said actuating means permitting differential action upon the rotation of one side gear at a rate different than the rotation of the case; and cam means acting between the case and the gears and responsive to relative rotation between the case and side gears for operating said actuating means.

15. A differential for receiving torque from a power source and delivering it to two output shafts comprising a rotatable casing provided with means whereby it can be rotated by said power source, said casing having axially aligned openings on opposite sides for receiving said output shafts, said openings being coaxial with the axis of rotation of said casing, differential gearing in said casing including a pair of side gears for connection respectively to said two output shafts and a pinion gear in mesh with both said side gears, means connecting said pinion gear to said casing for rotation with the casing, a pair of clutch means disposed respectively between said side gears and said casing, each said clutch means being capable in one condition of locking its side gear to said casing for rotation with the casing and in a second condition of releasing said side gear from said casing so that the casing and side gear can rotate at different speeds, said clutch means being in said one condition upon the application thereto of a predetermined force and being in a second condition upon release of said force, and a pair of force applying means for actuating respectively said clutch means, each said force applying means including a pair of engageable cam surfaces, said cam surfaces having a component parallel to said axis of rotation and the casing, one of said cam surfaces being rotatable with the casing and the other being rotatable about said axis of rotation with said differential gearing.

16. A differential gearing device for use with a rotatable power source comprising a rotary member adapted to be rotated about an axis by said power source, differential gearing including a pair of side gears rotatable about said axis, pinions engaging said side gears, and spider pins carrying said pinions, cam means connecting the rotary member to the spider pins and operative upon relative rotation of the spider pins and rotary member about said axis to provide a force acting parallel to said axis, and clutch means operable by said force for connecting said rotary member directly to said side gears.

17. In a differential for receiving torque from a power source and delivering it to two output shafts, a rotary power receiving member having means whereby it can be rotated by said power source, a side gear adapted for operative connection to an output shaft, means rotatably supporting the side gear for rotation relative to the rotary member, clutch means operative to connect the side gear to the rotary member for unit rotation with it, said clutch means being operative upon the application to it of a predetermined force, a pinion gear meshing with the side gear, means connecting the pinion gear to the rotary member for rotation with it, said last means including force applying cam means for applying operative force to said clutch means.

18. In a differential power transmission for use with a power source, a driving means rotated by said power source and providing a pair of cam surfaces, a pair of spider pins disposed respectively in contact with each cam surface, a pair of pinions rotatably mounted respectively on each of the spider pins, said cam surfaces and the contacting portions of the spider pins being shaped so that when power from said power source is applied to said driving means forces are applied to said spider pins tending to move them in opposite directions parallel to the axis of rotation of the driving means, a pair of side gears in mesh with said pinions, and locking means for locking said side gears to said driving means when said forces are applied to said spider pins, rotation of a side gear at a speed greater than the speed of the driving means providing a force acting in opposition to said previously mentioned force and tending to unlock said side gear from said driving means.

19. A differential power transmission according to claim 18 wherein said locking means comprises a pair of friction clutch elements connected respectively to the driving means and a side gear, said friction clutch elements having faces held in frictional engagement with each other by said forces applied to said spider pins.

References Cited in the file of this patent

UNITED STATES PATENTS

| | | |
|---|---|---|
| 1,552,305 | Hulett | Sept. 1, 1925 |
| 1,586,861 | Taylor | June 1, 1926 |
| 1,629,527 | Pondelich | May 24, 1927 |
| 2,064,152 | Conboy | Dec. 15, 1936 |
| 2,234,592 | Fitzner | Mar. 11, 1941 |
| 2,351,996 | Morgan | Apr. 12, 1944 |
| 2,397,673 | Lewis | Apr. 12, 1946 |
| 2,569,533 | Morgan | Oct. 2, 1951 |

FOREIGN PATENTS

| | | |
|---|---|---|
| 50,375 | France | Jan. 16, 1940 |
| | (Addition to No. 849,452) | |
| 654,224 | Germany | Dec. 18, 1937 |
| 736,780 | Germany | June 28, 1943 |
| 739,012 | Germany | Sept. 9, 1943 |
| 7,337 | Great Britain | May 15, 1915 |
| 620,176 | Great Britain | Mar. 21, 1949 |

UNITED STATES PATENT OFFICE
CERTIFICATION OF CORRECTION

Patent No. 2,971,404                         February 14, 1961

Ray F. Thornton

It is hereby certified that error appears in the above numbered patent requiring correction and that the said Letters Patent should read as corrected below.

Column 3, line 15, for "59" read -- 49 --; line 20, for "drivided" read -- provided --; column 7, line 15, for "con" read -- cone --; column 9, lines 30 and 31, strike out "one of said side gears at a rate greater than the rate of rotation of".

Signed and sealed this 15th day of August 1961.

(SEAL)
Attest:

ERNEST W. SWIDER                                 DAVID L. LADD
Attesting Officer                                    Commissioner of Patents